United States Patent
Knechtges

(10) Patent No.: US 8,346,428 B2
(45) Date of Patent: Jan. 1, 2013

(54) ELECTRONIC STABILITY PROGRAM FOR A LAND VEHICLE

(75) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 644 days.

(21) Appl. No.: 12/083,403

(22) PCT Filed: Oct. 12, 2006

(86) PCT No.: PCT/EP2006/009882
§ 371 (c)(1),
(2), (4) Date: Aug. 4, 2009

(87) PCT Pub. No.: WO2007/042305
PCT Pub. Date: Apr. 19, 2007

(65) Prior Publication Data
US 2009/0319118 A1 Dec. 24, 2009

(30) Foreign Application Priority Data
Oct. 13, 2005 (DE) .......................... 10 2005 049 083

(51) Int. Cl.
G01M 17/00 (2006.01)
G06F 7/00 (2006.01)
G06F 19/00 (2011.01)
G06F 11/30 (2006.01)
G07C 5/00 (2006.01)

(52) U.S. Cl. .................... 701/30.4; 701/29.1; 701/30.3; 701/36; 701/41; 701/48

(58) Field of Classification Search .................... 701/29, 701/31, 36, 41, 43, 48, 70, 76, 92
See application file for complete search history.

(56) References Cited

U.S. PATENT DOCUMENTS

| | | | | |
|---|---|---|---|---|
| 5,161,106 A * | 11/1992 | Shiraishi et al. | ................. | 701/43 |
| 5,510,989 A * | 4/1996 | Zabler et al. | ...................... | 701/1 |
| 6,226,581 B1 * | 5/2001 | Reimann et al. | ................. | 701/48 |
| 7,085,642 B2 * | 8/2006 | Samuel et al. | .................. | 701/82 |
| 7,245,995 B2 * | 7/2007 | Kueperkoch et al. | ........... | 701/29 |
| 2004/0030474 A1 * | 2/2004 | Samuel et al. | .................. | 701/36 |
| 2006/0204347 A1 | 9/2006 | Waldbauer et al. | | |

(Continued)

FOREIGN PATENT DOCUMENTS
DE 42 28 893 A1 3/1994

(Continued)

OTHER PUBLICATIONS

Richard Backhaus, "Die Servolectic von ZF". ATX Automobiltechnische Zeitschrift 100 (1998) 9, pp. 636-638.

Primary Examiner — Thomas Tarcza
Assistant Examiner — Rami Khatib
(74) Attorney, Agent, or Firm — MacMillan, Sobanski & Todd, LLC

(57) ABSTRACT

The invention concerns an electronic vehicle dynamics regulation system for a land vehicle, which system is set up for steering and braking intervention, and with which a sensor arrangement is associated, which sensor arrangement, for a steering intervention device and for a braking system which builds up braking forces independently of or in addition to the driver, captures the yaw angular velocity and/or the transverse acceleration and feeds them to the steering intervention device and braking system.

12 Claims, 1 Drawing Sheet

U.S. PATENT DOCUMENTS

2007/0095588 A1 5/2007 Mattes et al.

FOREIGN PATENT DOCUMENTS

| DE | 195 25 217 A1 | 1/1997 |
| --- | --- | --- |
| DE | 197 49 005 A1 | 1/1999 |
| DE | 101 62 689 A1 | 7/2002 |
| DE | 102 36 331 A1 | 2/2004 |
| DE | 102 51 949 A1 | 5/2004 |
| WO | WO 96/11128 | 4/1996 |
| WO | WO 2004/041612 A1 | 5/2004 |

* cited by examiner

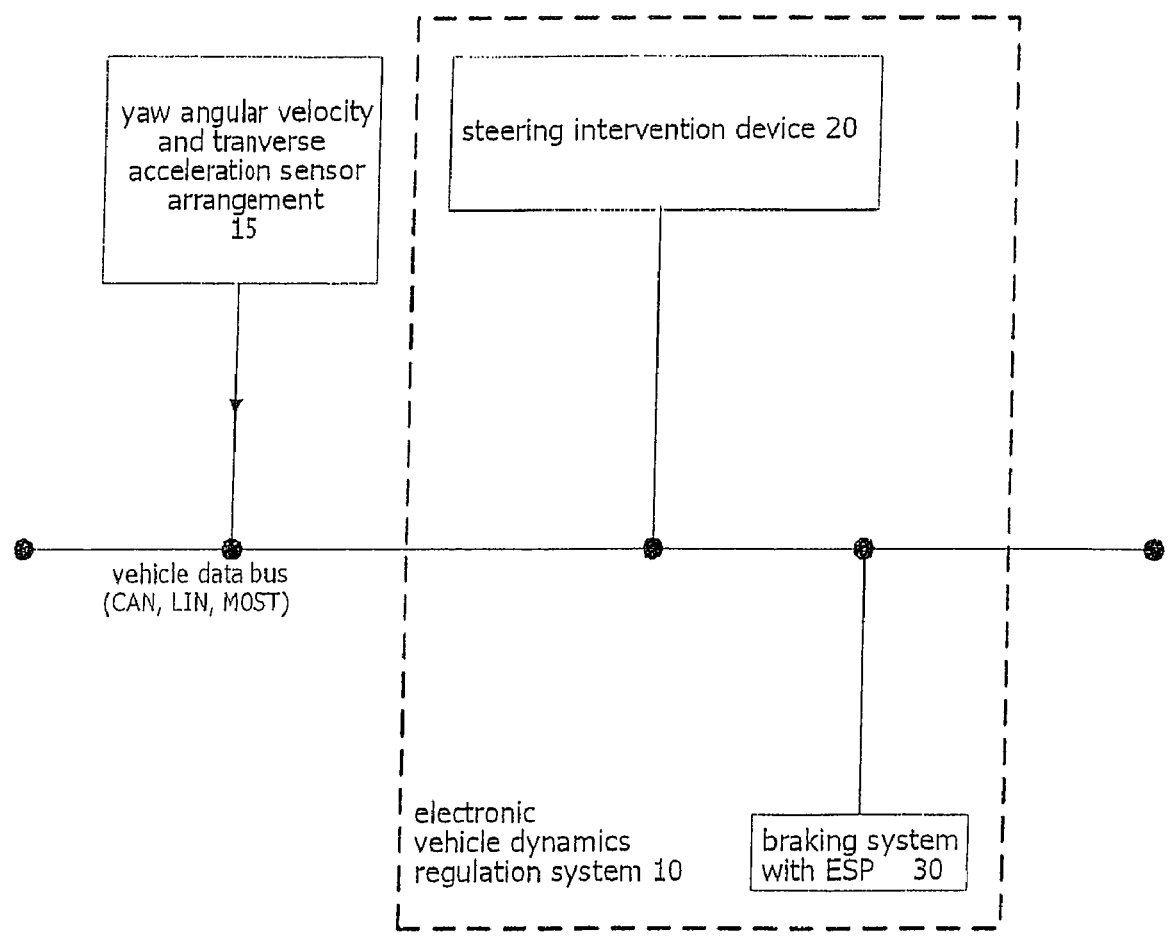

ELECTRONIC STABILITY PROGRAM FOR A LAND VEHICLE

CROSS-REFERENCE TO RELATED APPLICATIONS

This application is a National Stage of International Application No. PCT/EP2006/009882 filed Oct. 12, 2006, the disclosures of which are incorporated herein by reference in their entirety, and which claimed priority to German Patent Application No. 10 2005 049 083.2 filed Oct. 13, 2005, the disclosures of which are incorporated herein by reference in their entirety.

BACKGROUND OF THE INVENTION

The invention concerns an electronic vehicle dynamics regulation system for a land vehicle, which system is set up at least for intervention on steering and brakes. Such systems make it possible to provide numerous functions such as are not possible with today's systems with integrated brake and engine intervention (e.g. yawing moment compensation for braking on $\mu_{split}$).

The steering intervention by the vehicle dynamics regulation system can act on both power steering systems, in which the steering force is applied exclusively from an energy source which is present in the vehicle, and power-assisted steering systems, in which the steering force is applied by the driver and from an energy source which is present in the vehicle. In the case of overlaid steering, depending on steering wheel movements which the driver controls and the current vehicle-dynamic magnitudes of the vehicle, an additional steering angle is actively set via servo motors. The additional steering angle is usually overlaid on the steering wheel movements which the driver controls via a planetary gear train. It is thus possible to implement driver assistance functions (e.g. variable steering support depending on the vehicle speed) or stabilisation functions (e.g. improving driving stability, side wind compensation, counter-steering on a non-homogeneous surface, etc.). A possible implementation of such a steering intervention system is described in, for instance, ATZ Automobiltechnische Zeitschrift (automotive engineering journal) 100 (1998) 9, "Die Servoelectric von ZF (ZF's Servoelectric)".

The braking intervention can take place by means of braking equipment which can build up braking forces independently of or in addition to the driver. This is possible, for instance, by means of a hydraulic braking system which has anti-lock system, drive slip regulation and/or electronic stability programme functions. Such braking systems are capable of and intended for automatic braking. This is understood to include braking processes which usually take place independently of any force which the driver has applied to the pedal. These are, for instance, drive slip regulation, which prevents wheelspin of individual wheels during starting by targeted braking, or vehicle dynamics regulation (electronic stability programme, ESP), which adapts the vehicle behavior at the limit to the driver's wishes and road surface conditions by targeted braking of individual wheels, or adaptive cruise control, which among other things maintains a preset distance of the driver's own vehicle from the vehicle in front by automatic braking.

The sensor signals (which the vehicle dynamics regulation system processes) are prepared, the vehicle-dynamic setpoint magnitudes are calculated, and the manipulated magnitudes in each case are specified, usually by each of the regulation systems separately, on separate controllers. From the requirements-which are determined in this way, information is then generated and exchanged between the individual regulation systems. For instance, to calculate the setpoint vehicle movement magnitudes, ESP requires information about the total steering angle and the actually existing wheel steering angle. Compared with previous ESP systems, modifications to the ESP algorithms are unnecessary to a large extent. The vehicle's safety-critical range is reached when the braking pressure exceeds about 20 bar.

With the electronic vehicle dynamics regulation systems described above, it is possible to implement active steering. To a larger extent than with convenience influencing of steering processes, into the vehicle's safety-critical range, steering wheel movements which the driver controls are overlaid or replaced by a steering force which is applied by a motor. The vehicle's safety-critical range is reached when the steering moment to be overlaid by the steering wheel movement which the driver controls exceeds about 3 Nm, or when the steering angle to be overlaid exceeds about 0.4°.

With both previous and today's systems, for safety reasons, redundant provision of the yaw angular velocity and transverse acceleration sensors is seen as indispensable. This applies in particular to systems which are capable of generating relatively large steering moments or angles to be overlaid, with high dynamics. These sensors, which are present at least twice, are at least partly present separately for each of the vehicle dynamics regulation system or its regulating unit, and the braking systems of the anti-lock system, drive slip regulation and the electronic stability programme. Their signals are captured and evaluated separately. As part of a plausibility check on the signals, the measurement results are exchanged and compared between the individual systems or their regulating units. If there is a significant difference, the systems can detect an error case and be brought into a safe state.

BRIEF SUMMARY OF THE INVENTION

Starting from the above described situation, the invention is based on the problem of providing a less expensive, structurally simpler electronic vehicle dynamics regulation system, with comparable safety in operation.

The solution according to the invention now provides an electronic vehicle dynamics regulation system for a land vehicle, which system is set up for steering and braking intervention, and with which a sensor arrangement is associated, which sensor arrangement, for a steering intervention device and for a braking system which builds up braking forces independently of or in addition to the driver, captures the yaw angular velocity and/or the transverse acceleration and feeds them to the steering intervention device and braking system.

Further versions and possible modifications are defined in the subclaims, and explained in the following description, with their advantages.

In the steering intervention device and/or the braking system, for the signals which reproduce the yaw angular velocity and/or transverse acceleration, internal plausibility check mechanisms and/or self tests, by means of which the signals must be checked for plausibility and correctness, can be provided.

The internal plausibility check mechanisms and/or self tests end their checking of the signals within a period which is sufficient so that the signals, as actual magnitudes, enter the calculation of vehicle-dynamic setpoint magnitudes. The period can be about 50-500 msec, but also 200-500 msec. Each individual time value between these values must count as disclosed here.

Other advantages of this invention will become apparent to those skilled in the art from the following detailed description of the preferred embodiments, when read in light of the accompanying drawings.

BRIEF DESCRIPTION OF THE DRAWING

In FIG. 1, the block diagram of an electronic vehicle dynamics regulation system for a land vehicle, which system is set up for intervention on steering and brakes, is shown schematically, with associated sensor arrangement.

DETAILED DESCRIPTION OF THE INVENTION

FIG. 1 shows an electronic vehicle dynamics regulation system 10 for a land vehicle, which system is set up for intervention on steering and brakes and has a steering intervention device 20 and a braking system 30 which builds up braking forces independently of and in addition to the driver. A sensor arrangement 15 is associated with this vehicle dynamics regulation system 10, and captures the yaw angular velocity and/or the transverse acceleration and feeds them to the steering intervention device 20 and braking system 30. In this vehicle dynamics regulation system, the sensor arrangement 15, like all other components of the, is connected via a vehicle bus (CAN, MOST, LIN or similar) to the other components, for data/signal transmission.

Both in the steering intervention device 20 and in the braking system 30, for signals which reproduce the yaw angular velocity and the transverse acceleration, internal plausibility check mechanisms and/or self tests are provided. These internal plausibility check mechanisms and self tests are of such a form, and programmed in such a way, that they complete their checks on the signals within a period of 50-500 msec. This is sufficient so that the signals, as actual magnitudes, enter the calculation of vehicle-dynamic setpoint magnitudes, and previously their plausibility and correctness was checked. However, the invention also may be practiced with the period being about 200-500 msec. Each individual time value between the above values must count as disclosed here.

The request rate of the actual magnitudes in the steering intervention device is adapted to the period for the signal checks. Use is made of the recognition that the steering actuators can intervene significantly faster than the braking actuators, which go into the safety-critical range (see above). Nevertheless, the request rate of the actual magnitudes of the steering intervention device is adapted to the request rate of the actual magnitudes of the braking system. In other words, the request rate of the signals with the yaw angular velocity and/or the transverse acceleration by the steering intervention device is reduced to about half the measurement with which the braking system requests/receives/processes these signals. This action has no detectable effects on the safety or convenience of the vehicle dynamics regulation system.

Additionally, in the braking system, during the execution of the signal checks, at most braking forces which do not yet have a safety-critical level are built up. Similarly, in the steering intervention device, during the execution of the signal checks, at most steering moments or steering angles which do not yet have a safety-critical level are built up. Altogether, this system makes use of the recognition that the achieved positioning rate in the case of braking systems which build up braking forces independently of or in addition to the driver is sufficient to implement convenient electronic vehicle stabilisation. The sensor evaluation/checking speed which is required for this is also enough to enable steering intervention devices, which in principle react faster, to carry out steering interventions safely and conveniently; redundant sensor arrangements can therefore be omitted, and the signals which come from a sensor arrangement, and reproduce the yaw angular velocity and/or the transverse acceleration, are checked for plausibility and correctness, and then used in both (or in more, e.g. e-gas, e-chassis suspension, etc.) subsystems of the vehicle dynamics regulation system, as input signals to regulate them.

It is also possible to use the sensor arrangement of one of the existing subsystems, steering intervention device and braking system, or parts of it (e.g. the yaw angular velocity sensor only or the transverse acceleration sensor only), and to equip the other subsystem(s) without sensor arrangements from the start. Another alternative is to integrate all subsystems into the vehicle without sensors, and to connect them to each other and to a sensor arrangement via a data bus (CAN, LIN, MOST or similar).

The concept can also be used advantageously in the context of a central vehicle dynamics regulator (global chassis control, GCC), in which, for all systems which intervene in the vehicle dynamics, a correcting yawing moment (and other forces/moments if necessary) is determined. Then, in a force/moment distributor, the form and interaction in which these determined vehicle setpoint values are implemented by the various subsystems and their individual actuators (wheel brakes, steering actuators, throttle actuators, suspension strut actuators, etc.) is decided. This makes very efficient, energy-saving and integrated implementation of the requirements from operation of the vehicle possible.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electronic vehicle dynamics regulation system for a land vehicle that is set up for steering and braking intervention, the vehicle dynamics regulation system comprising:
a steering intervention device, the steering intervention system including at least one of an internal plausibility check and a self test for an input signal;
a braking system which builds up braking forces one of independently of the driver and in addition to the driver, the braking system including at least one of an internal plausibility check and a self test for an input signal; and
a sensor arrangement associated with the steering intervention device and the braking system, the sensor arrangement configured to capture at least one of an actual yaw angular velocity and an actual transverse acceleration and feed an output of the sensor arrangement as an input signal representing at least one of the captured actual yaw angular velocity and the actual transverse acceleration to the steering intervention device and the braking system,
with at least one of the internal plausibility check mechanisms and the self tests included in the steering intervention device and the brake system being applied to the input signal, within a signal check period which is sufficient so that the signals, as actual magnitudes, enter the calculation of vehicle-dynamic setpoint magnitudes, and
that the request rate of the actual magnitudes of the steering intervention device is a function of the request rate of the actual magnitudes of the braking system.

2. The electronic vehicle dynamics regulation system according to claim 1, wherein the signal check period is within a range of 50-500 msec.

3. The electronic vehicle dynamics regulation system according to claim 2, wherein the request rate of the actual magnitudes in the steering intervention device is adapted to the signal check period.

4. The electronic vehicle dynamics regulation system claim 3, wherein in the braking system, during the execution of the signal checks, braking forces which have not yet reached a safety-critical level continue to built up.

5. The electronic vehicle dynamics regulation system according to claim 3, wherein in the steering intervention device, during the execution of the signal checks, steering moments or steering angles which have not yet reached a safety-critical level continue to built up.

6. The electronic vehicle dynamics regulation system claim 2, wherein in the braking system, during the execution of the signal checks, braking forces have not yet reached a safety-critical level continue to be built up.

7. The electronic vehicle dynamics regulation system according to claim 2, wherein in the steering intervention device, during the execution of the signal checks, at most steering moments or steering angles which have not yet reached a safety-critical level continue to be built up.

8. The electronic vehicle dynamics regulation system according to claim 1, wherein the request rate of the actual magnitudes in the steering intervention device is adapted to the signal check period.

9. The electronic vehicle dynamics regulation system claim 8, wherein in the braking system, during the execution of the signal checks, braking forces which have not yet reached a safety-critical level continue to built up.

10. The electronic vehicle dynamics regulation system according to claim 8, wherein in the steering intervention device, during the execution of the signal checks, steering moments or steering angles which have not yet reached a safety-critical level continue to built up.

11. The electronic vehicle dynamics regulation system claim 1, wherein in the braking system, during the execution of the signal checks, the braking forces which have not yet reached a safety-critical level continue to be built up.

12. The electronic vehicle dynamics regulation system according to claim 1, wherein in the steering intervention device, during the execution of the signal checks, the steering moments or steering angles which have not yet reached a safety-critical level continue to be built up.

* * * * *